(12) United States Patent
Cabré Ozores

(10) Patent No.: US 9,588,354 B2
(45) Date of Patent: Mar. 7, 2017

(54) FLEXIBLE TEMPLE FOR SPECTACLES

(71) Applicant: EYEWEAR FROM BARCELONA, S.L., Barcelona (ES)

(72) Inventor: Alejandro Cabré Ozores, Barcelona (ES)

(73) Assignee: EYEWEAR FROM BARCELONA, S.L., Barcelona (ES)

(*) Notice: Subject to any disclaimer, the term of this patent is extended or adjusted under 35 U.S.C. 154(b) by 0 days.

(21) Appl. No.: 14/779,473

(22) PCT Filed: Mar. 5, 2014

(86) PCT No.: PCT/ES2014/000029
§ 371 (c)(1),
(2) Date: Sep. 23, 2015

(87) PCT Pub. No.: WO2014/118405
PCT Pub. Date: Aug. 7, 2014

(65) Prior Publication Data
US 2016/0054584 A1  Feb. 25, 2016

(30) Foreign Application Priority Data

May 10, 2013  (ES) ................. 201330568 U

(51) Int. Cl.
*G02C 3/00* (2006.01)
*G02C 5/16* (2006.01)
*B29D 12/02* (2006.01)
*G02C 5/14* (2006.01)
*G02C 5/00* (2006.01)
*G02C 5/08* (2006.01)

(52) U.S. Cl.
CPC ............... *G02C 5/16* (2013.01); *B29D 12/02* (2013.01); *G02C 3/003* (2013.01); *G02C 3/006* (2013.01); *G02C 5/008* (2013.01); *G02C 5/08* (2013.01); *G02C 5/143* (2013.01); *G02C 2200/16* (2013.01)

(58) Field of Classification Search
CPC .... G02C 2200/16; G02C 3/003; G02C 3/006; G02C 5/16; G02C 3/02; G02C 3/04
USPC ...... 351/156, 157, 124, 65, 41; 206/5; 2/445
See application file for complete search history.

(56) References Cited

U.S. PATENT DOCUMENTS

| | | | |
|---|---|---|---|
| 8,025,396 B1* | 9/2011 | Power | G02C 3/006 2/445 |
| 2010/0110366 A1* | 5/2010 | Shapiro | G02C 5/143 351/112 |
| 2013/0278883 A1* | 10/2013 | Lenz | G02C 3/006 351/123 |

* cited by examiner

*Primary Examiner* — Hung Dang
(74) *Attorney, Agent, or Firm* — Egbert Law Offices, PLLC

(57) ABSTRACT

A flexible temple for spectacles which separate at the bridge area, which has a narrow, elongate part, the ends of which are coupled to the frame, and which is closed at the rear of the head, and made up of a flexible structure with three specific, differentiated areas, at the ends and central portion, including: respective semi-rigid sections which correspond to straight sections of the temple at the ends thereof, corresponding to the portion at the temples of the wearer; and a flexible central area corresponding to the remainder that surrounds the head at the rear, with a higher degree of flexibility than that of the semi-rigid sections which allows the temple to be bent until the spectacles can be inserted in a case such as not to project from the space taken up by the frame.

4 Claims, 1 Drawing Sheet

FLEXIBLE TEMPLE FOR SPECTACLES

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The invention, as stated the title of the present specification, relates to a flexible temple for spectacles, which provides a number of advantages derived from innovative structural and constitutive characteristics, which will be described in more detail later, that represent an improvement and a novelty within the field of application.

More particularly, the object of the invention is focused on a temple for spectacles, particularly applicable to spectacles of the type for which the frame is opened by the bridge area and have as a support a part that connects, at the rear of the head, both portions of the frame, said temple having the innovative characteristic to be made up from a flexible structure with specific areas of a different nature at the ends thereof and central portion to provide different degrees of flexibility that favor the bending thereof, to allow its storage and transportation in a conventional-sized case and, in turn, the suitable rigidity for adjustment to the temples on the ears of the wearer.

The field of application of the present invention falls within the sector of industry dedicated to the manufacture of spectacles or glasses, focusing particularly on the scope of the frames and arms.

2. Description of Related Art Including Information Disclosed Under 37 CFR 1.97 and 37 CFR 1.98.

As a reference to the current state of the art, it should be noted that spectacles of the type that here concerned, consisting of, as stated, spectacles with a frame that is opened and closed ahead, are widely known, using a connector, for example a magnet, and which are held conventionally on the ears of the wearer on both sides of the head with a temple which is a single piece that remains closed at the rear of the head, thus keeping connected both sides of the frame that is separated ahead to put in and take off.

Said temple, however, formed usually by a piece of plastic material that is connected at the respective ends to a small leg or metal coupling piece which, in turn, connects articulately to the external ends of each of the frame portions including each of the lenses, usually consists of a substantially rigid or semi-rigid part to be able to adjust as a conventional frame resting on the ears of the wearer and thus serve as a support to the frame once connected in the bridge and arranged on the nose.

The problem of the above temple in said type of spectacles lies in the difficulty to store them in a small case, since said temple is rigid or semi-rigid, although, as it can be the case, is detachable, given that it is a piece that must surround the head of the wearer on its rear portion, occupies a considerable space and, therefore it is not suitable to be bent in a conventional case, but it should be used a case with rather larger size, with the disadvantage of storage that represents for the wearer.

To avoid said problem, a possible solution is the replacement of the temple by an elastic strap as restraint system, however, said solution makes that for its correct use the band must be adjusted tensioned at the head of the wearer, since otherwise the spectacles are not held. In this case, however, the discomfort is evident, because if it is not of spectacles that are not for sports use, the need of which are tensioned and adjusted to the head of the wearer can produce obvious discomfort as well as disadvantages in hairstyle or if a hat is used.

It would be desirable, therefore, having a type of temple for said type of spectacles which, without being elastic in order not to lose the shape and provide the suitable holding, has the necessary flexibility to be able to bent and store it in a case with conventional configuration and dimensions, the objective of the present invention being the development of said temple.

It should be noted, moreover, that is unaware of any other flexible temple for spectacles having technical, structural, and constitutive characteristics similar to those of the temple here proposed and as claimed.

BRIEF SUMMARY OF THE INVENTION

Thus, the flexible temple for spectacles proposed by the present invention is configured as a significant novelty within their field of application since, in accordance with its implementation and exhaustively, the objectives previously indicated as suitable are satisfactorily reached, the characterizing details being those that distinguish them, suitably set down in the end claims accompanying the present specification.

In particular, what the invention proposes is a temple for spectacles that being, as stated above, applicable to spectacles of the type that has a frame that is separated at the bridge area, is essentially configured from a narrow, elongated part, the ends of which have means for coupling to the external ends of each of the parts in which the frame is separated and, in a characterizing way, comprising three clearly differentiated areas consisting of:

respective areas of semi-rigid character, which correspond to two sections next to the cited the ends of the piece, being suitable to allow the support of spectacles on the temples of the wearer;

and a central area, that corresponding to the part thereof that subsequently surrounds the head of the wearer, where the piece that constitutes the temple acquires a character entirely flexible allowing the bending to the extent of being incorporated into a storage bag or case with conventional configuration and dimensions.

In a preferred embodiment of the invention, the described semi-rigid sections of temple of the invention are made of plastic material, preferably of TR90, consisting of a polymer with memory function, i.e., which allows a degree of flexibility and that, after being bent, always recovers its primitive form, being a material commonly used in frames for spectacles, since due to its lightness properties, high strength and broad color options, is optimal for said use.

Meanwhile, the central area of the temple is preferably made of a thermoplastic elastomer material, and more preferably, of a thermoplastic polyester elastomer or TPE-E (Thermoplastic Polyester Elastomer).

The advantage of said material, as well as the rest of thermoplastic elastomers, also referred to as thermoplastic rubbers, are a class of copolymers or a physical mix of polymers (usually a plastic and a rubber) is that they give rise to materials with thermoplastic and elastomeric characteristics. Moreover, while most elastomers are thermosets, thermoplastics are in contrast relatively easy to use in manufacturing, for example, by injection molding. Thermoplastic elastomers also show both advantages typical of rubbery materials and plastic materials.

Thus, said central area of the temple made of TPE-E has sufficient flexibility to be able to bend the temple without it deforms, and always recovering its original shape without any problems, even if it has been stored bent for a long time inside a very narrow case.

Therefore, and also in a preferred way, finally it should be noted that the temple is obtained from a double injection process, such that it makes up a single-piece bimaterial element, formed with the cited two sections at its ends made of TR90 and a central area made of TPE-E, which gives the proposed temple, in addition to the described advantage of flexibility in its central area and semi-rigidity in the area of the temples, on the one hand the advantage of high durability and structural strength and, on the other hand, the reduction of manufacturing cost.

In the light of the above, it is found that the described flexible temple for spectacles represents an innovation of structural and constitutive characteristics unknown so far to this end, reasons which in combination with its practical utility, provide it with enough basis to obtain the exclusivity privilege which is applied for.

BRIEF DESCRIPTION OF THE DRAWINGS

In order to complement the description that is being carried out and with the object to help to a better understanding of the invention, a set of drawings is accompanied to the present specification as an integral part thereof, in which, with an illustrative and non-limiting character, the following has been represented.

DETAILED DESCRIPTION OF THE INVENTION

Preferred Embodiment of the Invention

In light of the previously mentioned figures, and according to the numeration adopted, an example of a preferred and non-limiting embodiment of the flexible temple for spectacles can be observed therein, which comprises the parts and elements which are indicated and described in more detail below.

Figure 1:
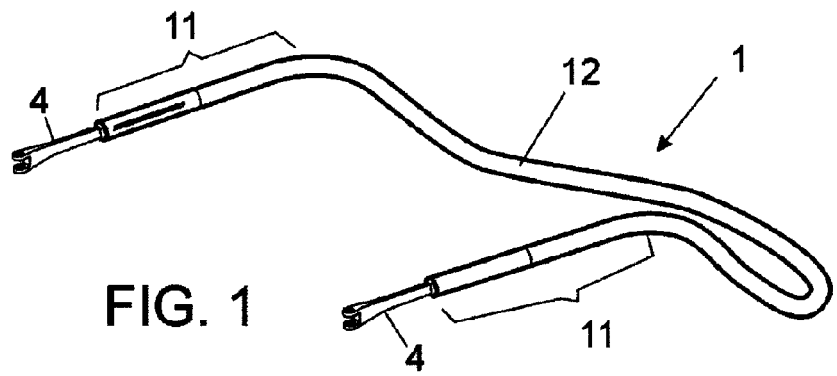
FIG. 1.—It shows a perspective view of a preferred exemplary embodiment of the flexible temple for spectacles, object of the invention, which shows its general configuration and the main comprising parts and elements.
Figure 2:
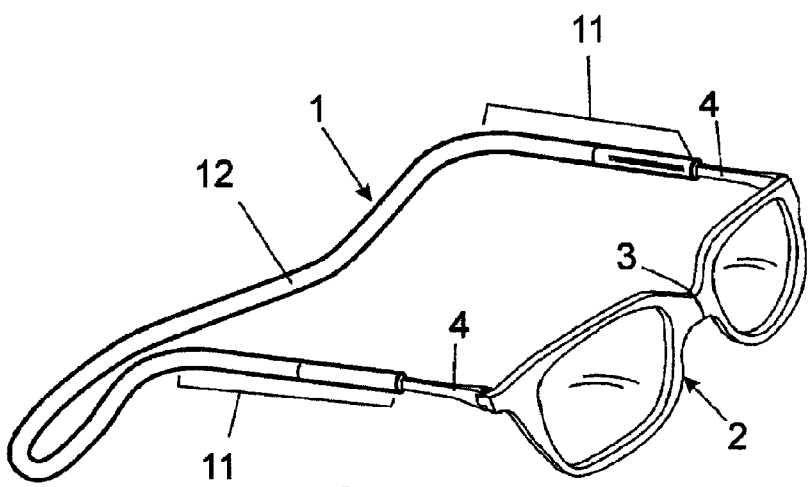
FIG. 2.—It shows a perspective view of spectacles with front opening at the bridge area, with the temple of the invention coupled thereto.
Figure 3:
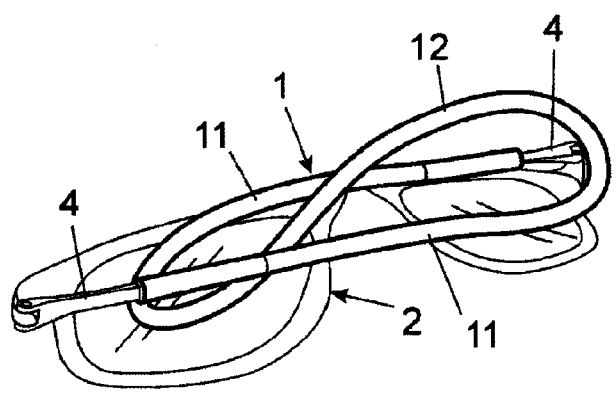
FIG. 3.—It shows a perspective view of the spectacles shown in the preceding figure, which has been represented with the temple, according to the invention, in bent position, being appreciated that it is suitable for introduction into a conventional-sized case.

Thus, as seen in said Figures, the involved temple (1), applicable for spectacles of the type for which frame (2) is separated at the bridge area (3), is configured from a narrow, elongated part, the ends of which are coupled to articulated connection means that, for example consisting of metal couplings (4) adjustable and insertable through simple pressure at the ends of the temple (1), connect it to the respective external ends of the cited frame (2), and, preferably made from an injection molding process, comprising respective semi-rigid sections (11), that is, with a certain degree of flexibility, corresponding to two sections that include a substantially straight section of the temple at their respective ends and that situate parallel to each other, corresponding to the part at the temples of wearer when this wears spectacles, for the support on the ears thereof, and being suitable for thus allowing the support of the spectacles, and a flexible central area (12), corresponding to the rest of the part, specifically to the portion of the part that subsequently surrounds the head of the wearer, having said central area (12) a higher degree of flexibility than that of the semi-rigid sections (11) and which allows the temple (1) to be bent until the spectacles can be inserted in a conventional storage bag or case, that is, in a way that the bent temple (1) does not project from the space taken up by the frame (2), as shown the FIG. 3.

Preferably, the semi-rigid sections (11) of the ends of the temple of the invention are made of plastic material, specifically polymer TR90, and the flexible central area (12) is made of elastomer material, specifically thermoplastic polyester elastomer or TPE-E, the temple (1) having been obtained from a double injection process, in a way that makes up a single-piece bimaterial element, made up of the cited two sections at its ends of TR90 and a central area of TPE-E.

Having sufficiently described the nature of the present invention, as well as the way of putting it into practice, it is not considered necessary to further extend its explanation for any person skilled in the art to understand its scope and the advantages derived therefrom, stating that, within its essence, it can be put into practice in other embodiments which differ only in detail from the one indicated by way of example, and which are also covered by the protection which is sought provided that its fundamental principle is not altered, changed or modified.

The invention claimed is:
1. An eyewear article comprising:
a frame having a bridge area and opposing external ends;
a pair of temples articulated respectively to said opposing external ends, each of said pair of temples having a straight metal coupling connected to and extending from said frame, each of said pair of temples having a semi-rigid section molded to and extending from an end of said metal coupling opposite to said frame, said semi-rigid sections being straight;
a flexible central area extending from ends of said pair of temples opposite said frame so as to extend across a back of a head of a wearer, said flexible central area having a flexibility greater than the semi-rigid sections, said pair of temples being foldable with respect to said frame being an extended position and a retracted position, said pair of temples being entirely positioned over or under and within an area of said frame when in said retracted position.

2. The eyewear article of claim 1, the semi-rigid section being formed of a polymeric material, said flexible central area being formed of an elastomeric material.

3. The eyewear article of claim 2, said polymeric material being a TR90 polymer, said elastomeric material being a thermoplastic polyester elastomer.

4. The eyewear article of claim 1, said metal coupling being adjustable and insertable through pressure at said end of the temple.

\* \* \* \* \*